No. 850,717. PATENTED APR. 16, 1907.
A. ARTER.
PLOW ATTACHMENT.
APPLICATION FILED OCT. 29, 1906.
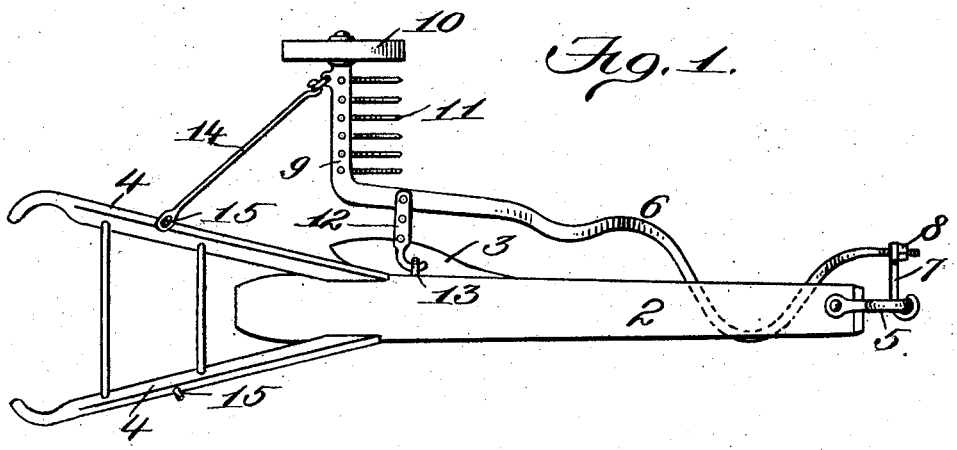
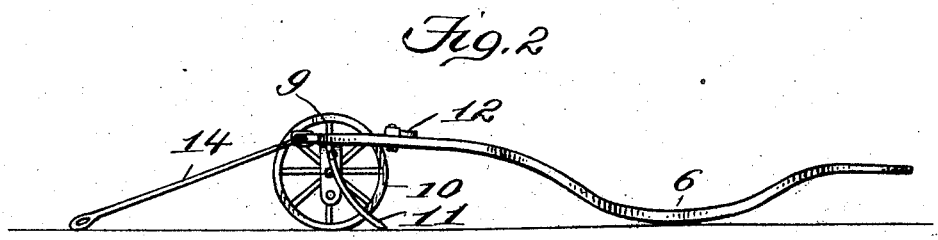

UNITED STATES PATENT OFFICE.

ALPHEUS ARTER, OF LISBON, OHIO.

PLOW ATTACHMENT.

No. 850,717. Specification of Letters Patent. Patented April 16, 1907.

Application filed October 29, 1906. Serial No. 341,157.

*To all whom it may concern:*

Be it known that I, ALPHEUS ARTER, a citizen of the United States, residing at Lisbon, in the county of Columbiana and State of Ohio, have invented new and useful Improvements in Plow Attachments, of which the following is a specification.

This invention relates to what I shall for convenience term a "plow attachment." The attachment, however, may be used in connection with other implements, although it is of peculiar advantage when employed in combination with a plow. In this particular use of the attachment it pulls all the tall weeds, grass, cornstalks, &c., into the furrow in front of the plowshare, where such substances are covered up by said plowshare. The device also prevents such materials from catching into the plowshare, as in case this result occurred the proper motion of the plow would be probably affected. In addition to the function pointed out as obtained by the attachment the same has in the present instance as a part thereof a leveler which levels off the furrow at the side of the one being plowed, by reason of which when the field is plowed it will be leveled over. The attachment, therefore, is in the nature of a combined weed-drag and furrow-leveler, and the components thereof may be of any desirable character. The weed-drag ordinarily consists of a bar of serpentine form, while the leveler may consist of a rake, as I find such latter article will not only level the newly-formed furrows, but will rake over the same.

By virtue of the attachment I can save labor and time in the preparation of a field, and the attachment whereby the same is accomplished is comparatively light, can be inexpensively made, and can readily and quickly be applied to a plow.

In the drawings accompanying and forming a part of this specification I show in detail one form of embodiment of the invention which to enable those skilled in the art to practice said invention will be fully set forth in the following description, while the novelty of said invention will be included in the claims succeeding such description.

Referring to said drawings, Figure 1 is a top plan view of a plow provided with an attachment involving my invention. Fig. 2 is a side elevation of said attachment.

Like characters indicate corresponding parts throughout the several figures.

In the drawings I have shown a plow of familiar construction, the same including in its makeup a beam, as 2, a share, as 3, handles, as 4, and a clevis, as 5. These several parts may be and preferably are of the ordinary character, for which reason it is unnecessary to go into a detailed description of the same. The weed-drag is denoted in a general way by 6, and it preferably has a swiveled connection at its forward end with the front of the beam 2. For example, the extreme forward end of said weed-drag may extend freely through a perforation in the body of a hook, as 7, represented as being in engagement with the clevis 5, and may be provided forward of said hook with a nut, as 8, to hold the said weed-drag in operative relation with said hook.

The construction described provides for lateral and vertical movement of the weed-drag. In fact, the said weed-drag may have practically a universal movement. The weed-drag is shown as extending under the beam 2 and rearwardly at an angle to said beam 2, such angle being outward with respect to said beam. By reason of this the weed-drag covers a comparatively large area as the plow is drawn over the ground. In addition to the novel disposition of the drag the same is made of serpentine or zigzag form, the bends thereof being of any desirable formation—for example, curved. By virtue of this novel relation the drag will cover a larger area than it would if it was straight. In addition to this result the bends in the drag cause the latter to take hold of the weeds, grass, and cornstalks and bear the same down, so that such material will not foul the plowshare. The term "weed-drag" is used in a broad sense, for the device thus termed not only pulls down weeds, but other growths which under ordinary conditions will interfere with the action of the plowshare. The weed-drag, as will be understood, is of irregular form, and this irregularity I obtain in the present case by making the article in question of the shape hereinbefore specified.

In addition to pulling down the weeds and other undesirable growths in advance of the plowshare I level off the furrow just turned up or the one just to the side of the plowshare, and this result I advantageously accomplish by a rake, the body of which is designated by 9 and is shown as consisting of a yoke or U shaped member, the inner branch of which is united with the rear end of the weed-drag 6. In fact, these two parts may be made integral. To the outer branch of the body 9 I have shown as connected adjustably a guide, as 10, which ordinarily consists of a wheel. The teeth of the rake are denoted by 11, and they extend downwardly and forwardly from the transverse member of said body at an angle.

Connected with the attachment, preferably in an adjustable manner and at substantially the junction of the weed-drag 6 and body 9, is a bar, as 12, the inner end of which is jointed to the eye 13, the shank of which is preferably screwed into the beam 2. The connection between the bar 12 and eye 13 therefore permits the ready raising and lowering of the attachment by a rod, as 14, connected with said attachment and which is adapted to engage pins, as 15, on the handles 4 to hold said attachment elevated.

The weed-drag not only pulls down all weeds at the side of the plowshare, but in advance of the same, owing to the fact that said weed-drag or the forward part thereof is located in front of and in advance of said plowshare and also of the fact that it extends along the beam.

What I claim is—

1. The combination of the beam of a plow, and a weed-drag connected with the forward end of said beam, extending under said beam between its ends and then along one side of the beam.

2. The combination of the beam of a plow, and a weed-drag connected with the forward end of said beam, extending under said beam between its ends and then along one side of the beam, said weed-drag being of serpentine form.

3. The combination of the beam of a plow, a weed-drag connected with said beam, extending under said beam between its ends and along one side thereof, and a leveling-rake connected with said weed-drag.

4. The combination of the beam of a plow, a weed-drag connected with said beam, extending under said beam between its ends and along one side thereof, and a leveling-rake connected with said weed-drag, and provided at its outer side with a guide-wheel.

5. The combination of the beam of a plow, a weed-drag connected at its forward end with the forward end of said beam, said weed-drag being extended between its ends under the beam and then continuing rearwardly along one side of said beam, and a leveling-rake connected with the rear end of the weed-drag, extending outward therefrom and provided with a guide-wheel.

6. The combination of the beam of a plow, a weed-drag of serpentine form connected with the forward end of said beam, extending under said beam and then rearwardly along one side of the same, a leveling-rake extending outward from the rear end of the weed-drag, an operative connection between the weed-drag and beam, a rod connected with said rake to raise and lower the same, and separated pins upon the handles of the plow for engagement by said rod.

In testimony whereof I have hereunto set my hand in presence of two subscribing witnesses.

ALPHEUS ARTER.

Witnesses:
   W. G. WELLS,
   LOIS R. VAN FOSSAU.